(12) United States Patent
Boillot et al.

(10) Patent No.: US 7,834,850 B2
(45) Date of Patent: Nov. 16, 2010

(54) METHOD AND SYSTEM FOR OBJECT CONTROL

(75) Inventors: Marc Boillot, Plantation, FL (US); Jason McIntosh, Sugar Hills, GA (US)

(73) Assignee: NaviSense, Plantation, FL (US)

( * ) Notice: Subject to any disclaimer, the term of this patent is extended or adjusted under 35 U.S.C. 154(b) by 899 days.

(21) Appl. No.: 11/562,413

(22) Filed: Nov. 21, 2006

(65) Prior Publication Data
US 2007/0120834 A1      May 31, 2007

Related U.S. Application Data

(60) Provisional application No. 60/740,501, filed on Nov. 29, 2005.

(51) Int. Cl.
*G09G 5/00* (2006.01)
(52) U.S. Cl. .......................... 345/158; 200/52
(58) Field of Classification Search ......... 345/156–184; 715/863; 200/52
See application file for complete search history.

(56) References Cited

U.S. PATENT DOCUMENTS

| | | | |
|---|---|---|---|
| 5,274,363 A | 12/1993 | Koved | |
| 6,130,663 A | 10/2000 | Null | |
| 6,137,427 A | 10/2000 | Binstead | |
| 6,313,825 B1 | 11/2001 | Gilbert | |
| 6,937,227 B2 | 8/2005 | Qamhiyah | |
| 7,078,911 B2 | 7/2006 | Cehelnik | |
| 7,081,884 B2 | 7/2006 | Kong | |
| 7,092,109 B2 | 8/2006 | Satoh | |
| 7,130,754 B2 | 10/2006 | Satoh | |
| 2005/0088416 A1* | 4/2005 | Hollingsworth | 345/173 |
| 2006/0161871 A1* | 7/2006 | Hotelling et al. | 715/863 |
| 2006/0256090 A1 | 11/2006 | Huppi | |

* cited by examiner

*Primary Examiner*—Amare Mengistu
*Assistant Examiner*—Yuk Chow

(57) ABSTRACT

A system (111) and method (200) for providing sensory feedback (210) for touchless feedback control is provided. The system can include a touchless sensing unit (110) that detects at least one position (304) of an object in a touchless sensing space (300), and an indicator (166) communicatively coupled to the touchless sensing unit that provides sensory feedback associated with the at least one position. The indicator can change in accordance with a location, a recognized movement, or a strength of the touchless sensing space. The sensory feedback can be associated with acquiring a touchless control or releasing a touchless control. The sensory feedback can be visual, auditory, or haptic.

20 Claims, 5 Drawing Sheets

METHOD AND SYSTEM FOR OBJECT CONTROL

CROSS-REFERENCE TO RELATED APPLICATIONS

This application claims the priority benefit of U.S. Provisional Patent Application No. 60/740,501 entitled "Method and System of Controlling Illumination for Providing Visual Feedback" filed Nov. 29, 2005, the entire contents of which are hereby incorporated by reference. This application also incorporates by reference the following Utility Applications: U.S. patent application Ser. No. 11559295, entitled "Method and System for Directing a Control Action", filed on Nov. 13, 2006, U.S. patent application Ser. No. 11559325, entitled "Method and System for Touchless User Interface Control", filed on Nov. 13, 2006; U.S. patent application Ser. No. 11562404, "Method and System for Object Control", filed on Nov. 21, 2006; and U.S. patent application Ser. No. 11562408, entitled "Method and System for Range Measurement", filed on Nov. 21, 2006.

BACKGROUND

1. Field

The present embodiments of the invention generally relates to the field of motion sensing, and more particularly to user input devices.

2. Introduction

A computer system generally includes a mouse to navigate and control a cursor on a computer display. A cursor on the screen moves in accordance with the motion of the mouse. A touchpad or stick can also be used to control the cursor on the display. The mouse, touchpad, and stick generally require physical movement to assume control of the cursor. A user generally receives physical feedback when using a mouse, touchpad, or joystick. In one example, a touchless user interface can be used in place of the mouse to navigate a cursor object.

SUMMARY

Broadly stated, embodiments of the invention are directed to a system and method for providing sensory feedback for touchless feedback control. The system can include a touchless sensing unit that detects at least one position of an object in a touchless sensing space, and an indicator communicatively coupled to the touchless sensing unit that provides sensory feedback associated with the at least one position. The sensory feedback can be visual, auditory, or haptic. The indicator can further include a timer that identifies a length of time the object is moving, and a feedback unit cooperatively connected to the timer that changes a behavior of the sensory feedback in accordance with the length of time.

In one configuration, the sensing unit can generate a touchless sensing space that includes a plurality of boundary regions each associated with at least one color. The indicator can change to a color when the position of the object is within a boundary region corresponding to the color. The intensity of the indicator can also change based on a strength of the touchless sensing space at the location of the object. The touchless sensing unit can be an array of ultrasonic sensors that are integrated within a keyboard, laptop, headset, or mobile device. The indicator can be a light emitting diode, a monitor, a light contrast display (LCD), an array of illuminating elements, a laser, a color strip, a sound speaker, or a vibration element. In one arrangement, the indicator can project a light pattern on the object, wherein the light pattern changes behavior in accordance with the location of the object. In one arrangement, the indicator can be an illumination element behind a keypad that emanates visible light through the keys.

One embodiment is directed to a method for providing sensory feedback during touchless control. The method can include the steps of monitoring a movement of an object in a touchless sensing space, and providing sensory feedback in accordance with the movement, wherein the sensory feedback is visual, auditory, or haptic. The method can further include identifying a location of the object, and adjusting a behavior of the sensory feedback based on the location. The method can further include determining a length of time the object is at the position, and adjusting a behavior of the sensory feedback based on the length of time. The method can further include determining if the location is within a boundary region of a touchless sensing space, and changing to an illumination that corresponds to the boundary region. The step of adjusting can change a lighting pattern, a blinking rate, an intensity, or a color.

Another embodiment is directed to a method for providing sensory feedback during touchless object control. The method can include detecting a movement of a finger within a touchless sensing space, controlling an object in accordance with the movement, and providing sensory feedback in accordance with the controlling, wherein the sensory feedback is visual, auditory, or haptic. The sensory feedback can be adjusted in accordance with a strength of the touchless sensing space. The method can further include determining if the finger is within a boundary region, and changing to an illumination that corresponds to the boundary region. An intensity of the illumination can be changed based on a strength of the touchless sensing space at the location of the finger. In one aspect, an illumination can be adjusted to signify gaining control of the object, and adjusting the illumination to signify relinquishing control of the object. In another aspect, the touchless sensing unit can recognize a movement of the object, and change the sensory feedback to signify that the movement that is recognized.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
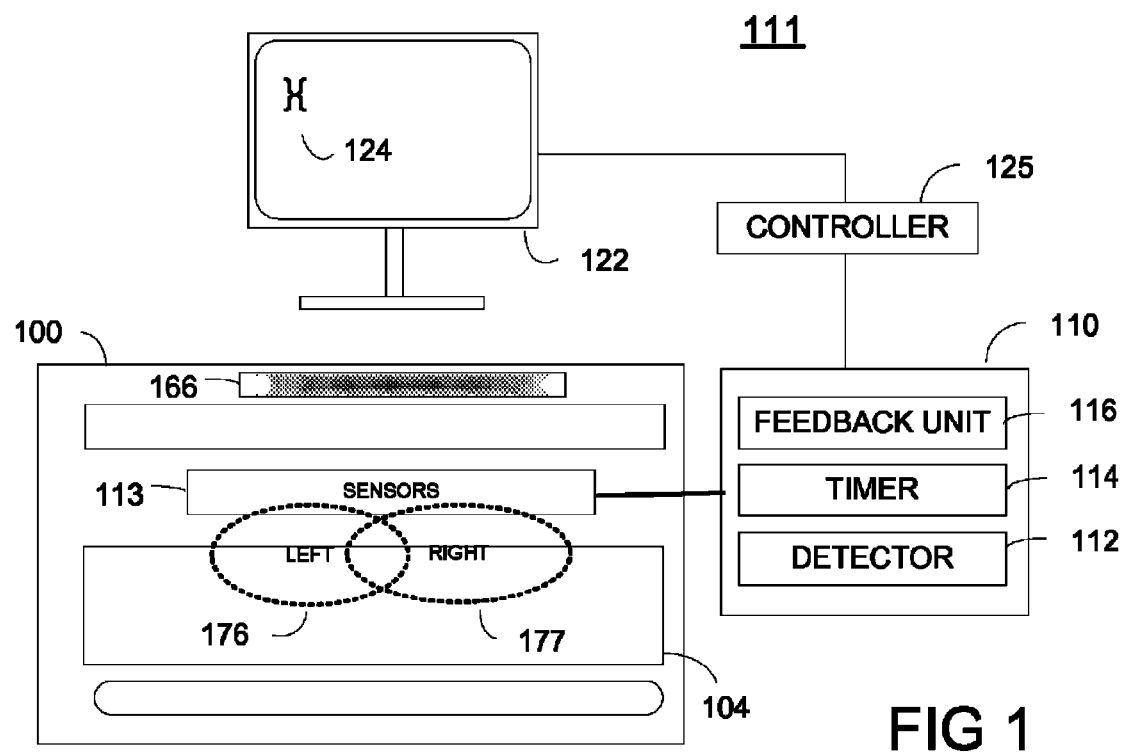
FIG. 1 is a touchless user interface system providing sensory feedback within a computer environment in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a midlet, a source code, an object code, a shared library/dynamic load library and/or other sequence of instructions designed for execution on a computer system.

The term "touchless" can be defined as without physical touch. The term "touchless sensing" can be defined as sensing movement without physical touching of the object causing the movement. The term "cursor" can be defined as a visual object on a display that provides control to an underlying object. The cursor can be a handle to an object in the display, or a physical object remote from the display. The term "cursor object" can be defined as an object that can receive coordinate information or command actions. In one example, a cursor object can be the target of a game control for handling an object in the game. The term "activating" can be defined as enabling, disabling, or moderating a control. The term "activation cue" is defined as an action that imparts an operation on a control. The operation can be the initiating of the control, the termination of the control, the pausing of the control, or the moderating of the control though is not limited to these. The activation cue can be a physical motion such as a finger movement, hand gesture, or a vocal motion such as a spoken utterance though is not limited to these. The term "cue' can be defined as an act or behavior; the act may be rehearsed or intentional but not limited to these. The term "bounded region" can be defined as an enclosed region. The term "banded" can be defined as a non-enclosed region having an interior portion and at least one non-interior portion. The term "behavior" can be defined as a change of in pattern or attributes such as color, intensity, brightness, contrast, hue, frequency. A "pattern" can defined as an organized structure and/or sequence of effects having attributes that may or may not repeat over time. The term "illumination" can be defined as an attribute of light such as color, intensity, brightness, contrast, hue, frequency. The term "position" can be defined as an orientation, a point, an absolute location, or a relative displacement. The term "location" can be defined as an area, a coordinate, a point, or a place.

One embodiment of the invention is a system for controlling illumination for providing visual feedback during touchless control. The system can include a touchless sensing unit, and an illumination element communicatively coupled to the touchless sensing unit. The touchless sensing unit can detect at least one position of an object, and the illumination element can change a behavior, such as a light pattern, as a function of the position. In one aspect, the illumination can change in response to acquiring a touchless control or releasing a touchless control.

One embodiment is a method for controlling illumination. The method can include the steps of detecting a movement of an object, identifying the position of the object, and adjusting an illumination based on a position of the object. In one arrangement, the method can include enabling an illumination behavior when a finger is within a first boundary region, adjusting a color pattern of an illumination element as the finger moves within a touchless sensing space, and disabling an illumination behavior when a finger is within a second boundary region. The color pattern can provide a visual indication for the strength of the touches sensory space.

FIG. 1

Referring to FIG. 1 a touchless user interface system 111 is shown in the context of a keyboard environment. The touchless user interface system 111 can include a keyboard 100, a controller 125, and a display 122. The keyboard can include a touchless sensing unit 110 comprising an array of sensors 113 for creating a touchless sensing space, a detector 112 for tracking touchless finger movements above the keyboard 100 in the touchless sensing space, a timer 114 for identifying a time a finger is at a location in the touchless sensing space, and a feedback unit 116 for providing sensory feedback related to the location and movement of the finger in the touches sensing space. Briefly, the controller 125 can handle or move an object, such as a cursor 124 on the display 122 in accordance with touchless finger movement above the keyboard 100. The hands or fingers do not have to be in contact with the sensing unit 110 or the keyboard 100. The keyboard 100 can be a computer keyboard, a mobile communication text pad, a personal digital assistant keypad, a game control keypad, a set of key buttons on a mouse, but is not limited to these.

The feedback unit 116 can be operatively coupled to an indicator 166, which can be a lighting element to provide visual feedback, a speaker to provide auditory feedback, or a mechanical unit such as a vibrating element to provide physical feedback. The feedback unit 116 can adjust the sensory feedback of the indicator 166 in accordance with a movement of the finger in the touchless sensing space. As one example, a color of the indicator 166 can change depending on the location of a finger above the keyboard 100. The intensity of the light can change in accordance with a movement of the finger, or with a strength of the touchless sensing space. In one arrangement, the indicator 166 can be a light emitting diode, a light contrast display (LCD), an array of illuminating elements, a laser, a color strip, or a monitor. The indicator 166 can be part of the sensing unit 110 or a standalone separate device. As another example, the indicator 166 can produce an auditory sound when a finger enters a boundary region, stays for a certain time length at a same location, or retracts from a boundary region in the touchless sensing space. Similarly, the indicator can introduce a vibration effect in accordance with the finger location and movement.

Briefly, the sensing unit 110 can track a finger movement within the touchless sensing space. In one arrangement, the sensing unit 110 can detect movement over the keys 104 from the left hand within the touchless region 176 and movement from the right hand within the touchless region 300. The extent of the region is not limited to the sizes illustrated in 176 and 300, which are demarcated as boundaries for illustration. The sensing space is an approximate three dimensional touchless region. In one embodiment, the sensors 113 are ultrasonic transducers that emits high energy pulses for detecting a location of the finger using pulse-echo location. The sensing space corresponds to a region within which a reflected high energy pulse can be detected. The sensing space is a function of the emitted pulse strength and the range (e.g. distance). The sensing space can be tuned to have a strength that corresponds to the maximum extent of the finger. In general, a user typing at a keyboard can extend and move the finger within a maximum range of finger motion approximated by an ellipse having a volumetric radius under 10 to 12 inches. The user can move the finger within the sensing space without moving the hands away from a normal typing position. The sensing unit 110 can also produce a sensing field greater than 12 inches for other applications.

In one embodiment, a user can raise a finger above the keyboard 100 to gain control of a cursor object 124. The raising of the finger and the holding of the finger at a certain location is an activation cue. The detector 112 can consider the activation cue an intentional gesture or motioning of a finger within the touchless sensing space. The timer 114 can determine a time window for which the activation cue is valid. For example, when a user intentionally places a finger directly above a sensing element 113 for 1 second, the detector 112 and the timer 114 can identify the position of the finger, and a time the finger is at the position, as a signal to commence a control. The indicator 166 can then change a behavior to inform the user that control is granted. For example, the indicator 166 may change to a green color. In response to the activation cue, the controller 125 can track the finger and move a cursor 124 on the display 122 in accordance with the finger movement. When the user stops moving the finger, or abruptly retracts the finger from the touchless sensing space, the controller 125 can cease tracking and control of the cursor. The indicator 166 can then change behavior, such as changing to a red color, to signify that control has been relinquished. Notably, the feedback unit 116 can identify the touchless movements, in addition to location, to control the sensory feedback of the indicator 166. In another arrangement, the sensing unit can be a plurality of imaging elements such as a video camera, a camera, or a web camera, for capturing an image of a finger. A pattern recognition unit within the detector 112 can analyze the images to determine a finger position or movement. Accordingly, the feedback unit 116 can change an lighting behavior upon recognizing a movement.

FIG 2

Figure 2:
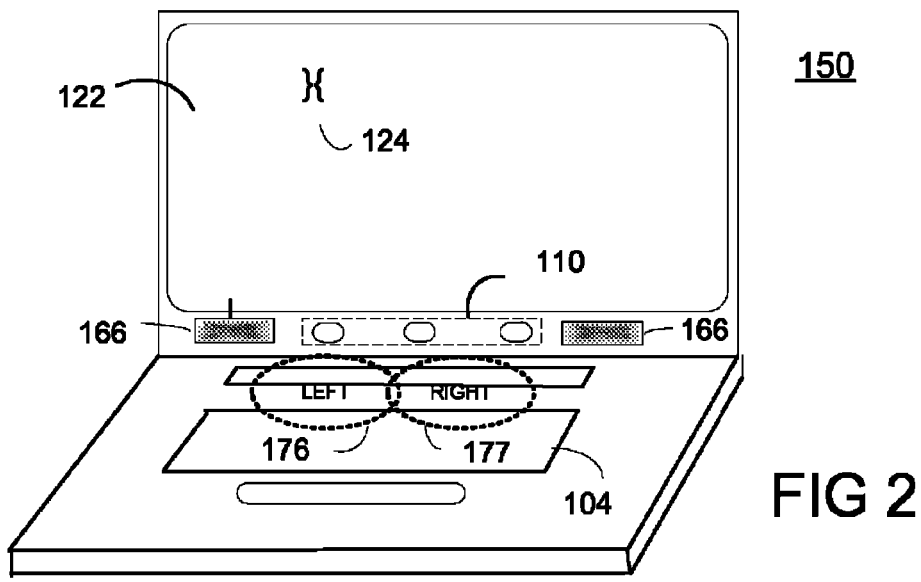
FIG. 2 is a touchless user interface system providing sensory feedback within a laptop environment in accordance with an embodiment of the inventive arrangements.

Referring to FIG. 2, another exemplary embodiment of the touchless sensing unit 110 is shown. In particular, the sensing unit 110 can be integrated within a laptop 150, or mounted on a laptop display as shown in FIG. 2. The illumination element 166 can be positioned above the keys on the keyboard of the laptop 150, or on the display as shown in FIG. 2. In another arrangement, the illumination element 166 can be placed under they keys 104 to emit light from under the keypad (e.g. keys 104 of the keyboard 100). The indicator 166 can change a lighting pattern in response to a finger movement or position above they key pad. The illumination element 166 emanates light that is visible to a user. Alternatively the illumination element 166 can be positioned as a software computer graphics within a display of a computer or laptop. For example, a widows based activity icon can be included in a task bar for informing a user of an activity status. Alternatively, a windows graphical user interface can present a software version of the light pattern. For example, the software can change the color, pattern, hue, and effect of the lighting information provided by the feedback unit 116.

FIG. 3/4

Figure 3:
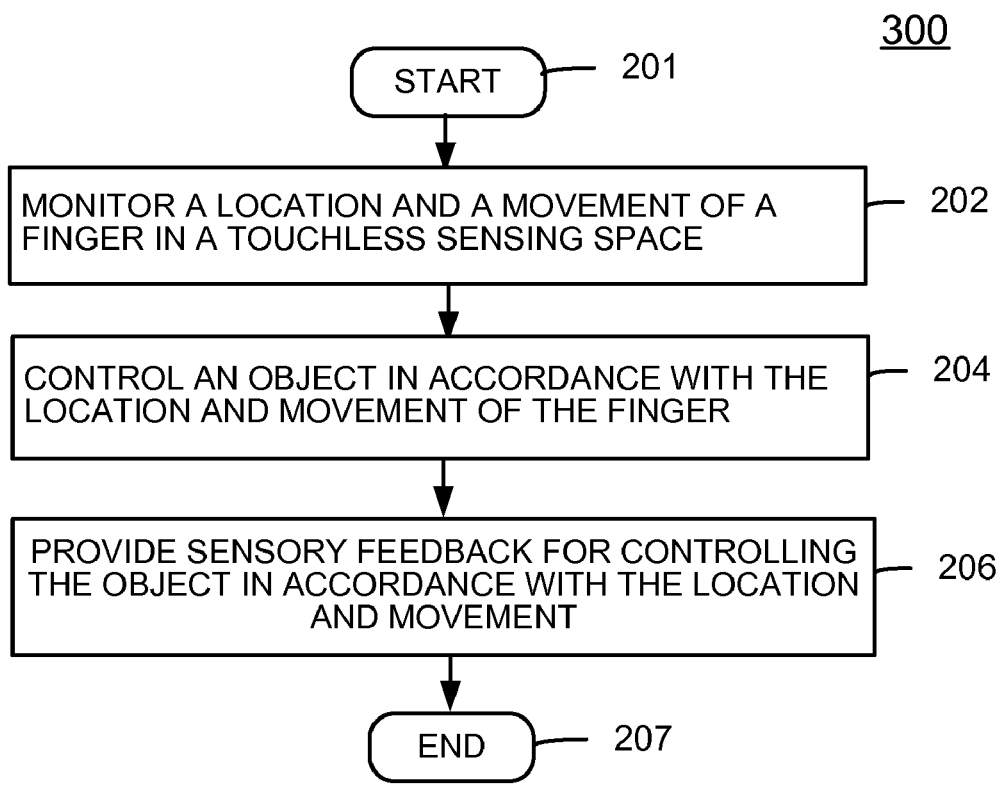
FIG. 3 is a method for sensory feedback in accordance with an embodiment of the inventive arrangements.
Figure 4:
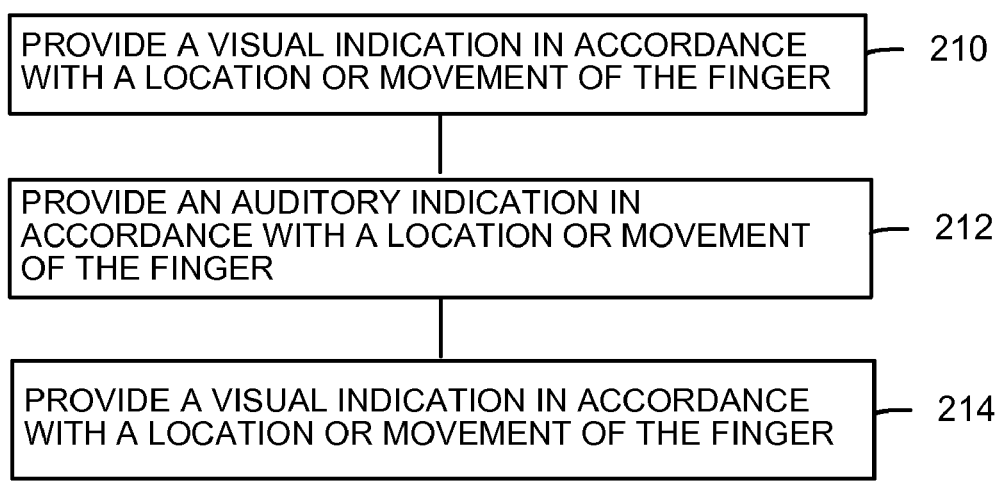
FIG. 4 is a list of sensory feedback indicators in accordance with an embodiment of the inventive arrangements.

Referring to FIG. 3, a method for providing sensory feedback for touchless control is provided. When describing the method 300, reference will be made to FIG. 1, 2, 3, and 4 although it must be noted that the method 300 can be practiced in any other suitable system or device. Moreover, the steps of the method 300 are not limited to the particular order in which they are presented in FIG. 4. The inventive method can also have a greater number of steps or a fewer number of steps than those shown in FIG. 4.

At step 201, the method 200 can start. Briefly, referring back to FIG. 1, the sensing unit 110 can sense finger movement above the keys 104 within the regions 176 and 300 to control a cursor object 124 on a monitor 122 (e.g. host display). The sensing unit 110 detects finger movement above the keyboard 100 without the user having to manually control an input pointing device such as a mouse, a stick, a touchpad, or, having a physical apparatus connected to the user. The sensing unit 110 maps finger motion, or hand motion, to a coordinate signal for controlling movement of a second object such as a cursor. For example, a user can control a cursor 124 using the sensing unit 110 to interact with a computer application for performing tasks such as text editing, web browsing, checking email, messaging, code programming, playing a game, or the like. In a particular example, the user controls a cursor within a text processing application, such as to identify where text can be entered and displayed (e.g. cut and paste). In another example, the user can control an object displayed within a program application. The object can be local to the program application or can be an object outside of the program application. The sensing unit 110 can be used to control objects in gaming, mobile device systems, multimedia rendering engines, visual rotation systems, painting applications, simulation, media control, automotive applications, adjusting audio controls, adjusting multimedia controls, and the like.

Returning back to FIG. 2, at step 202, a location and movement of a finger in a touchless sensing space can be monitored. Briefly, referring back to FIG. 1, the sensing unit 110 can identify a location of the finger by analyzing time of flight measurements. The sensing unit 110 can include a transmitter and receiver sensor 113 for transmitting and receiving ultrasonic signals. The transmitter and emitter can be the same signal for providing dual transmit and receive functions. In another arrangement, the sensing element can be an array of micro acoustic microphones or micro speakers for transmitting and receiving audio signals. In another arrangement, the sensing element can be charge coupled device (CCD) camera elements, analog integrated image circuits, MEMS camera elements, laser elements for receiving and processing light.

In the case of using ultrasonic sensing elements, the sensing unit employs pulse-echo detection to estimate a range and position of an object within view of the sensing elements. A transmitter in the sensing unit emits a pulse shaped signal that reflects off an object which is detected by a receiver element in the sensing unit. The receiver element is coupled with a detector that detects a signal reflected off an object as part of the motion detection logic in the sensing unit. The detector can include additional processing logic such as thresholds, comparators, logic gates, clocks, and the like for detecting an object's motion. The sensing unit 110 calculates a position of the object causing the reflection by solving a set of geometric equations.

A single transmit and receive element pair in the ultrasonic sensing unit calculates a first range (e.g. distance) of an object in the sensing space. A first transmit and receive pair on an x-axis estimates a longitudinal range of the object (e.g. finger). A second pair, arranged separately from the first pair, estimate a second range. The second pair estimates a latitudinal range of the object (e.g. finger). Accordingly, the two range measurements establish a position (e.g. location) of the object causing the signal reflection by mathematically combining the geometrically related range measurements. For example, the first range measurement establishes a x-coordinate and the second range measurement establishes a y-coordinate. The location of the object is then determined to correspond to the point (x,y) in a single plane. For example, the plane will be oriented in the direction of the first and second paired ultrasonic elements. Accordingly, a third pair can produce a range measurement in a third direction thereby establishing a three-dimensional coordinate system (x,y,z) if the first, second, and third range measurement projections are orthogonal to one another.

Notably, the sensing unit 110 can contain multiple sensing elements positioned and arranged in various configurations for receiving range measurements in varying directions for calculating the position and movement of the object causing the reflection using multi-path signal processing techniques. The paired transmit and receive elements can be on a same principal axis or a different principal axis. The sensing unit can also employ beamforming techniques for estimating the objects location. The system 100 can include a computer for receiving the coordinate signal from the sensing unit 110 or detector 107 for moving a cursor object in accordance with a detected movement. The sensing unit 110 additionally produces differential coordinate signals for satisfying the input signal requirements of a USB or Bluetooth mouse input device connection interface. Notably, a computer mouse generally uses a USB device driver for receiving differential signals for moving a cursor along each principal axis of the computer coordinate system. The sensing unit 110 produces differential signal for each principal axis to comply with the requirements of the USB or Bluetooth mouse device driver interface.

Returning back to FIG. 2, at step 204, an object can be controlled in accordance with the location and movement of the finger. As an example, the object can be the cursor 124 on the display 122, but is not limited to such. Referring to FIG. 1 a user can position two hands above a keyboard 100 for controlling a cursor object 124 within a display 122. The controller 125 can convert the finger location and movement to cursor coordinates for controlling the cursor 124 object. The controller 125 can move the cursor 124 in accordance with the location and movement of the finger in the touchless sensing space. As an example, a first finger on the left hand and a second finger on the right hand can control the cursor object 124. The user can move the first and second finger for signing motion to the computer to control the cursor object 124. For example, a single finger can produce an activation cue, or two fingers can be used to generate an activation cue. The indicator can present a visual indication in response to the type of movement recognized. For example the activation cue can be the positioning of the finger at a particular location for a pre-specified amount of time. The activation cue can also be a sign, such as a figure eight pattern, a circle, or a check. The user can motion the finger to outline a sign such that the sensing unit 110 identifies the sign and interprets the sign as an activation cue. The indicator 166 can present sensory feedback in accordance with the sign recognized. The action can also correspond to a mouse behavior such as a single click, a double click, a scroll, a left click, a middle click, a right click, or a hold operation. Using two fingers allows a user to navigate a cursor object with one finger and perform an action using a second finger. The user can leave the hands in the default typing position without having to displace one hand to activate a mouse behavior, such as a single or double click. In one particular example, the sensing unit 110 tracks finger movement using an ultrasonic pulse-echo configuration. The ultrasonic sensing unit 110 tracks coherent and continuous movement when only one finger 187 is moving within the finger space region 300.

At step 206, sensory feedback can be provided for controlling the object in accordance with the location and movement. Sensory feedback can include visual, auditory, or physical feedback. For example, referring to FIG. 4, the indicator 166 can provide visual indications (210) such as a change in lighting pattern or color, an auditory indications (212) such as a change in tone or sound, or a physical indications (214) such as a vibration effect. Referring back to FIG. 1, the feedback unit 116 can change the color of the indicator 166 based on a location or movement of the finger in the touchless sensing space. The feedback unit 116 can also produce an audible sound or vibration effect based on the location. In one configuration, the detector 112 can identify finger movements in addition to a location of the finger. The indicator 166 can change behavior in response to a recognized movement. As an example, the user may issue a touchless click to select the control of an object in the display 122 handled by the cursor 124. For example, the user may move the cursor over an object in the display, and abruptly move the finger to select the object. The abrupt movement can be associated with a touchless finger click. The detector 112 can identify the touchless finger click as a selection request, and the feedback unit 116 can tell the indicator 166 to play a sound or change a color in response to the touchless finger click. In such regard, the feedback unit 116 provides touchless control information using sensory feedback. At step 207, the method 220 can end.

In one configuration, the detector 112 can identify whether the location of the finger is within a first boundary regions (or band), or outside a second boundary region (or band) for activating a control. When the finger is actively navigating the cursor 124 within the sensing space, the detector 112 can identify finger actions for controlling the cursor 124, and the indicator 166 can change in accordance with the finger actions. In another example, a user can control the cursor object 124 using a first and second finger. The first finger can control navigational movement and the second finger can control an action on the cursor. The detector 112 can track the fingers separately and the feedback unit 116 can change an illumination of the illumination element 166 as a function of the dual finger motion. For example, the indicator 166 can provide a first illumination for a right finger movement, and a second illumination for a left finger movement.

FIG. 5

Figure 5:
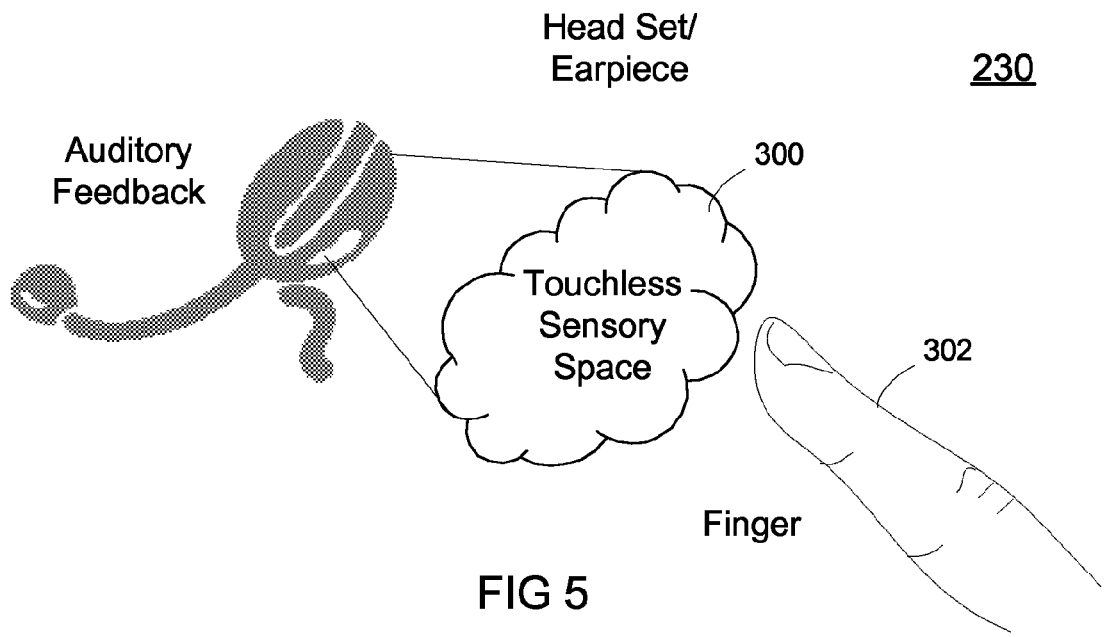
FIG. 5 a touchless user interface providing sensory feedback in a headset environment in accordance with an embodiment of the inventive arrangements.

Referring to FIG. 5, another exemplary application for the sensing unit 110 and is shown. In particular, the sensing unit 110 can be integrated within a headset 230, such as a Bluetooth mobile device headset. The sensing unit 110 can project a touchless sensing space 300 that allows a user to adjust one or more controls of the headset 230, or mobile device associated with the headset. In one arrangement, the indicator 166 can be the earpiece sound speaker (not shown) of the headset 230. The feedback unit 116 can identify a location and movement of a finger 302 within the touchless sensing space 300. The feedback unit 116 can control a delivery of sound to the earpiece based on the location and the movement. For example, the user may move the finger 302 in a clockwise circular motion to scroll through a virtual selection list of songs, emails, or voice messages. As the user moves the finger, the indicator 166 can play an audible indication corresponding to the current virtual selection. For example, a sound clip of a song can be played when the finger is at an absolute or relative location corresponding to the song. The feedback unit 116 can change the intensity of the sound clip to a maximal setting when the user is centered over a virtual selection item. The feedback unit 116 can lower the intensity as the finger moves to the next virtual selection item. Notably, the feedback unit changes a sensory feedback in accordance with the movement of the finger in the touchless sensing space. In another arrangement, the indicator 166 can be a vibration element in the headset that vibrates in accordance with the location and movement of the finger 302.

FIG. 6

Figure 6:
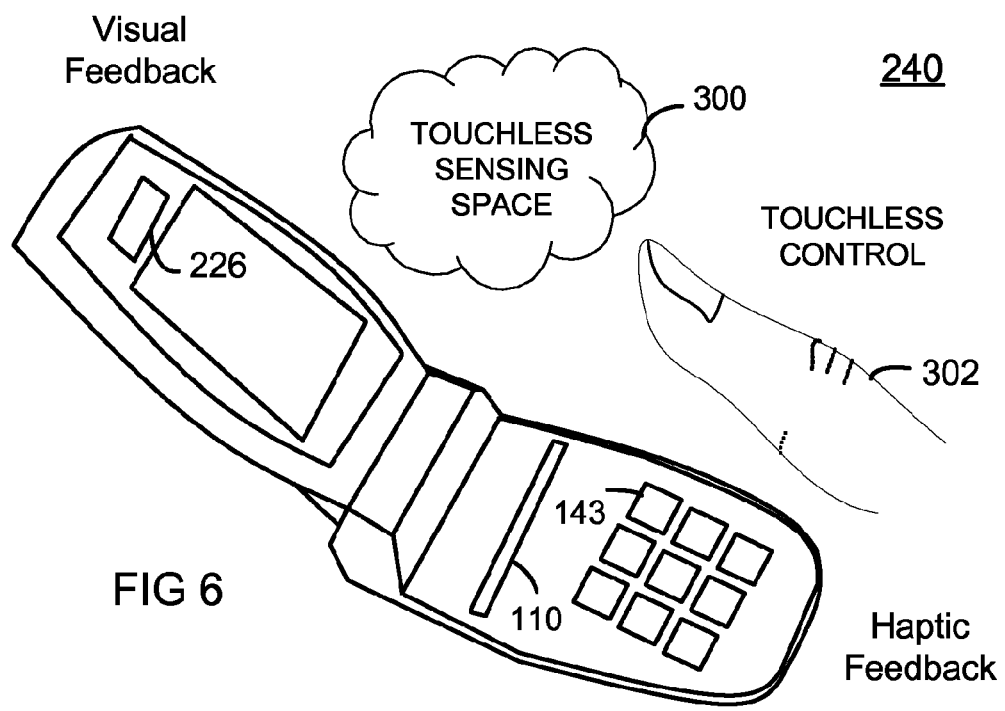
FIG. 6 a touchless user interface providing sensory feedback in a mobile device environment in accordance with an embodiment of the inventive arrangements.

Referring to FIG. 6, another exemplary application for the sensing unit 110 is shown. The sensing unit 110 can be integrated with a mobile device 240. In one arrangement, the sensing unit 110 can be placed above a keypad 143 of the mobile device 240. The sensing unit 110 can create a touchless sensing space 300 over the keypad 143 and in front of a display. The touchless sensing space 300 is not limited to the arrangement shown. For example, the touchless sensing space 300 can be above the keypad, above the display, or above another portion of the mobile device 240. The touchless sensing space 300 provides a virtual interface to the mobile device. A user can position a finger 302 or a thumb within the touchless sensing space 108 to handle one of more controls of the mobile device, such as a menu item 226.

Notably, the sensing unit 110 and the associated components can be integrated within the mobile device 240. For example, the detector 112, the timer 114, and the feedback unit 116 can be a chip such as an Application Specific Integrated Circuit (ASIC) that is operatively connected to the processor of the mobile device. In another arrangement, the components can be entirely in software and coded on a Digital Signal Processor (DSP) within the mobile device. Moreover, the sensing elements 166 may comprise microphone elements already provided on the mobile device 240.

The detector 112 can detect a movement of a finger above the keypad 143 and provide positional information to the feedback unit 116. The feedback unit 116 can change a behavior of the indicator 166 as a function of the finger position. The indicator 166 may be a display backlight, a user interface component, a light pipe, a speaker, or a vibration element, and is not limited to the location shown on the mobile device 240. A behavior can be a change in color, intensity, contrast, or brightness. A light pattern can include symbols having cross regions, hatched regions, or various shapes. For example a light pattern can be a sweep of a laser element generating a pattern, outlining a pattern, or producing a time-varying shape. The illumination element can change a color pattern as the finger moves within the touchless sensing space. A color pattern can have attributes such as blinking rate, contrast, hue, intensity and color. The lighting effects, (e.g. attributes), can change as a function of the finger position.

In one arrangement, the indicator 166 can project a light pattern on the finger within the touchless sensing space. For example, when the indicator 166 is behind the keys of the keyboard 100 and projecting a light pattern through the keys, the intensity of the light pattern can be sufficient to produce a light pattern on a finger above the keyboard. The indicator 166 can produce light patterns that reflect off the finger and that are visible to the user. For example, a user can position the finger within a boundary region associated with a light color. The indicator 166 can generate a light pattern that reflects the light pattern off the finger to notify the user that the finger is within a boundary region associated with the light pattern.

FIG. 7

Figure 7:
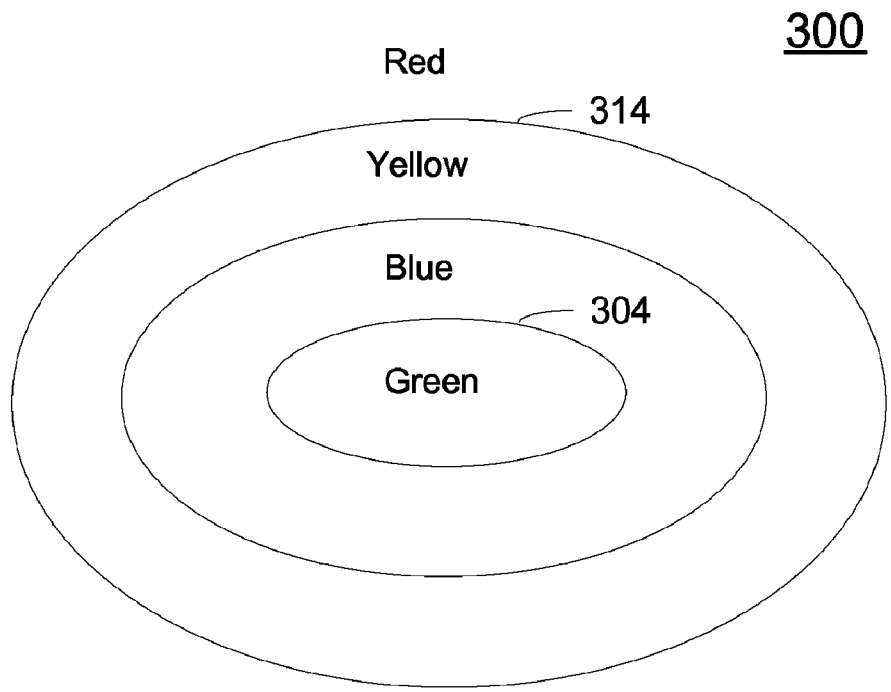
FIG. 7 is an illustration for boundaries for sensory feedback in a touchless sensing space in accordance with an embodiment of the inventive arrangements.

Referring to FIG. 7, an illustration for the boundary regions of the touchless sensing space 300 is shown. The boundary regions identify the colors of the lighting pattern as a user moves a finger within the touchless sensing space of the sensing unit 110. That is, the sensing space 300 can include a plurality of boundary regions each associated with at least one color, wherein the indicator 166 changes to a color when a finger is positioned in a boundary region. As an example, the indicator 166 can produce a green color illumination when the finger is within the center boundary region 304. The center boundary region may be a region close to the sensing unit 110, wherein the touchless sensing field strength is strongest. As another example, the indicator 166 can produce a red color illumination when the finger is outside the far boundary region 314. The far boundary region may be a region far from the sensing unit 110 where the touchless sensing field strength is weak. In one arrangement, the light pattern provides visual feedback to inform a user of the strength of the touchless sensing space, and those regions that have greater sensitivity. In another arrangement, the light pattern also provides visual feedback to inform a user of the boundaries of control. That is, besides only presenting a color corresponding to a location in the touchless sensing space 300, the indicator can change a color based on a type of movement into or out of one of the boundaries for acquiring or relinquishing control.

FIG. 8

Figure 8:
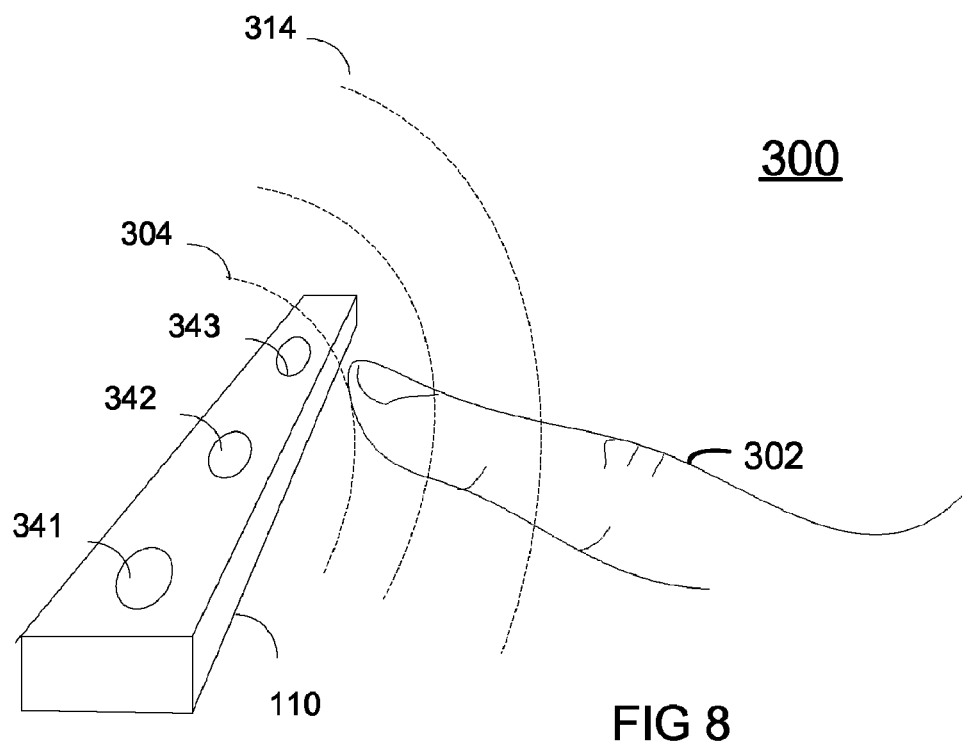
FIG. 8 is an illustration of a touchless sensing space in accordance with an embodiment of the inventive arrangements.

Referring to FIG. 8, the sensing space 300 is shown is shown in greater detail. Briefly, the sensing unit 110 can include a plurality of sensors for creating the touchless sensing space 300. For example, sensor 342 can be a transmit sensor, and sensors 341 and 343 can be receive sensors, but are not limited to such arrangement. The transmit sensor 342 can emit a high energy signal that reflects off the finger 302. The receivers 341 and 342 can measure a time of flight of the emitted signal and identify a location of the finger in the touchless sensing space 300. The feedback unit 116 (not shown here) can adjust the indicator 166 based on the location and movement of the finger.

The sensing space 300 corresponds to the region within which a user can move a finger for controlling an object. The sensing space 300 includes boundaries that demarcate the extent of the sensing space and the points at which a control can be activated. The sensing unit 110 can associate boundaries with time of flight distances. For example, a first boundary 304 is a locus of points with each point having a corresponding time of flight distance. In one configuration, the boundaries can be banded regions. In one example, navigation control of a cursor 124 is enabled when a user moves the finger 302 within a first boundary region 304. In another example, navigation control is disabled when the user moves the finger outside a second boundary region, such as 314. In general, the sensing space 300 originates at the sensing unit 110 and projects outward from the sensing unit 110 to the maximal extent of finger range motion. Generally, the complete range is less than 10 inches.

For example, the range of finger motion may correspond to the region between the lowest point which the user can point a finger and the highest point which the user can raise a finger with minimal moving of the hand. The first boundary region 304 can correspond to the lowest point, and the second boundary region 314 can correspond to the highest point 312. Notably, various boundary regions and bands can be defined within the touchless sensing space for activating controls. The sensing space 300 can be greater than or less than the area shown in FIG. 3 with respect to the user's range of finger movement.

FIG. 9

Figure 9:
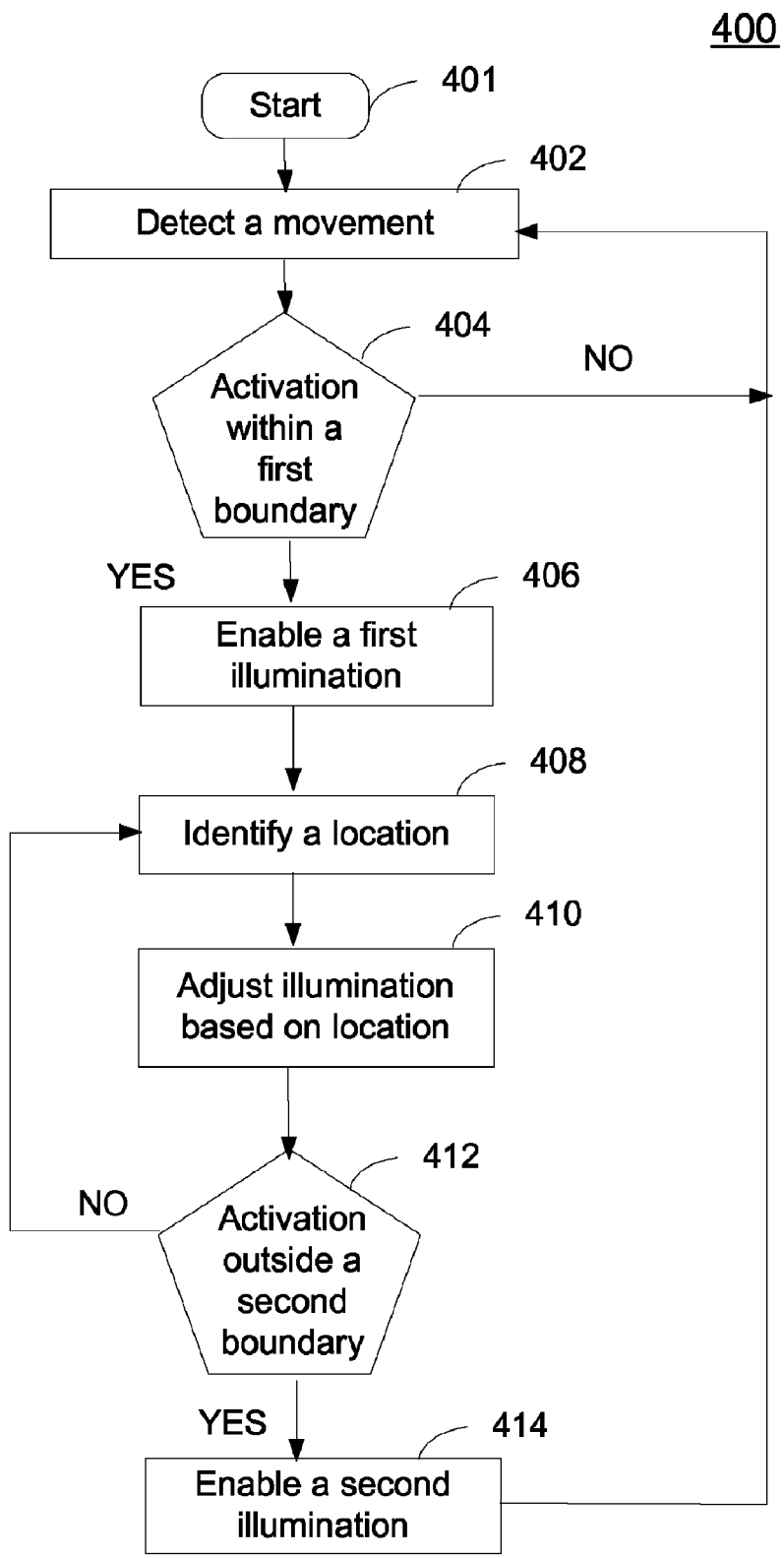
FIG. 9 is a flowchart for providing sensory feedback during touchless control in accordance with an embodiment of the inventive arrangements.

Referring to FIG. 9, a flowchart 400 for activating a cursor object is shown. When describing the flowchart 400, reference will be made to FIGS. 1, 2, 7 and 8, although it must be noted that the flowchart 400 can be practiced in any other suitable system or device. Moreover, the steps of the flowchart 400 are not limited to the particular order in which they are presented in FIG. 9. The flowchart 400 can also have a greater number of steps or a fewer number of steps than those shown in FIG. 9.

At step 401, the flowchart can begin. At step 402, a movement can be detected. For example, referring to FIG. 1, a user typing at the keyboard 100 can temporarily pause from typing and raise a finger, such as the right finger 187, within the finger space region 300. The sensing unit 110 awaits an ultrasonic signal reflection, and upon receipt, the detector 112 detects a finger movement. The detector 112 can also detect finger movement for the laptop 150, the headset 230, and the mobile device 240 embodiments. At step 404 an activation within a first boundary can be evaluated. Recall from FIG. 7, that the sensing space can include a plurality of boundary regions each associated with a sensory feedback effect. The first boundary can correspond to any one boundary within the sensing space. For example, referring to FIG. 1, the detector 112 determines if the finger 187 is located at a position within a first boundary 304 of the sensing space. Notably, the sensing unit 110, when using ultrasonic pulse echo detection, provides an estimate of the finger location by solving a set of geometric equations using multiple range measurements. The detector 112 assesses whether the location of the finger determined by the sensing unit 110 is within an activation range (e.g. boundary or banded region). For example, referring to FIG. 8, the first boundary 304 corresponds to an elliptical boundary sufficiently close to the sensing unit 110. The far elliptical boundary 314 can be up to 10 inches away from the sensing unit 110. Each point within the boundary can be described by a three dimensional (x,y,z) point. Alternatively a plane within the elliptical region can be described by a two dimensional point (x,y). For example, referring to FIG. 7, a planar slice of a series of concentric elliptical boundary regions are shown. The user can raise a finger within the center ellipse 304 to generate an activation cue. Notably, each point along a principal axis is described by a TOF. Accordingly, a TOF uniquely describes a position that can be identified as falling within or outside of a boundary region. For example, referring back to FIG. 8, a first boundary can correspond to a radius of approximately 1 inch from the sensing unit 110 though is not limited to this range. Accordingly, when a user positions a finger 302 within the first boundary region 304, the sensing unit 110 detects movement and the detector 112 identifies an activation cue. Notably, the activation cue includes a temporal attribute to ensure that an activation cue was intentional. For example, the timer 114 sets a time length of 1 second such that the detector 112 associates the finger placement with an activation cue. The time length can be pre-specified and can vary in accordance with a user preference. For example, the user may position the finger within 1 inch of the sensing unit for a time length of 1 second, thereby satisfying the first boundary position criterion. The user leaves the finger within the first boundary region for at least 1 second before the detector 112 identifies the movement as an activation cue.

At step 406, a control can be enabled if an activation cue is identified. For example, referring to FIG. 3, the user positions the finger 302 within the first boundary region 304 for a pre-specified amount of time to create the activation cue, i.e. the user intentionally positions the finger within a particular region for a pre-specified amount of time to take control of the cursor for moving the cursor 124 on the display 122. If the detector 112 determines that the finger is within the correct region (e.g. the first boundary 304 of the sensing space 300) and the timer 114 determines that the finger positioning has satisfied the time requirements of an activation cue, the feedback unit 116 enables a navigation control. When the sensing unit is an arrangement of ultrasonic transducers, the sensing unit 110 determines a position of the finger using time of flight (TOF) measurements. For example, an activation cue can be specified as the placing a finger 302 at the center position of the sensing unit for at least one second. Notably, with a transmitter (TX) 342 and receiver (RX) 342 pair on the left, and a transmitter (TX) 342 and receiver (RX) 343 pair on the right the TOF is the same for the left pair and the right pair if the TX/RX pairs are symmetrically placed with respect to the center of the sensing element 110. Notably, the TOF increases as the finger moves away from the sensing unit 110 since the transmitted pulse must travel a farther distance. Accordingly, the finger can be identified within a first boundary region when the TOF satisfies a range associated with the first boundary region, and within a second boundary region when the TOF satisfies a range associated with the second boundary region.

When the detector 112 identifies an activation cue, the controller 125 (FIG. 1) enables a navigation control of the cursor 124 on the display 122. The flowchart for controlling sensory feedback 400 can operate together with a cursor control such that control of the cursor is granted when an intentional action, such as an activation cue, is initiated to assume control of the cursor. Understandably, a sensing unit that moves the cursor 124 in accordance with a finger movement, and having no control mechanisms, would continually move the cursor as the user is typing. The sporadic movement of the cursor while the user is interfacing with a computer may be considered an annoyance by a user. In practice, a user does not generally navigate a cursor during normal the typing of text. An activation control method allows a user typing at the keyboard to take control of a cursor under an established control condition; that is, when the user intentionally gestures an activation cue, such as the positioning of a finger at a particular location for a pre-specified amount of time. Accordingly, the feedback unit 166 coordinates lighting effects with a cursor control based on the location of a finger within the sensing space (e.g. finger space region) such that visual feedback is provided to the user for navigating the cursor within the sensing space and controlling the cursor.

The indicator 166 informs a user of the status of the activation cue. For example, the indicator 166 can be a light emitting diode (LED), light contrast display (LCD), a color stick, a software graphics display, or a voice responder for providing a visual or auditory cue back to the user. In the particular example of a LED, the LED lights up when the activation cue is detected. In another aspect, the intensity of the LED slowly increases as the time length approaches the pre-specified time length and begins to blink when an activation cue is detected. In another configuration the indicator 166 changes color as a function of an object's position. The indicator informs the user that the user can gain control of the cursor 122 thereby removing uncertainty as to when control is granted.

For example, referring to FIG. 7, the sensing space 300 (e.g. finger space region) can have boundaries associated with different activation colors. For example, the center region 304 corresponds with the color green and the outer region 314 corresponds with the color red. Green can visually signify to the user that a control has been granted, such as navigational control of the cursor object. Red can visually signify to the user that control has been restricted, for example, when the user moves a finger outside the sensing space. The feedback unit 116 can slowly change the illumination from a first color to a second color by blending colors. For example, the colors can be adjusted on a continuous wavelength scale changing colors in accordance with a physical light spectrum. The feedback unit 116 can slowly decrease the illumination as a finger moves from a first boundary region to a second boundary region, and increase the illumination as the finger moves closer to a first boundary region.

The center region 304 can correspond to an activation region for detecting an activation cue. For example, the first boundary region 304 is associated with a first illumination that visually signifies gaining control of a cursor object, and the second boundary region 314 is associated with a second illumination that visually signifies relinquishing control of the cursor object. Enabling navigation control at the center region 304 based on an activation cue allows a user to move the cursor in any direction with reference to the center position; up, down, right, left, and diagonal. The user can control the cursor within the sensing space until the user moves the finger outside the boundary 314 at which point the indication element changes to a red color. Other colors are contemplated within the embodiments of the invention. Navigation control is disabled and the user can move the finger back within the sensing space without the cursor moving from the position at which navigation control was disabled. The user reenters the finger to the region 304 without moving the cursor to assume navigation control. Notably, the user relinquishes control of the cursor when the finger exceeds a second predefined boundary region. Upon relinquishing control, the cursor stays at the last position when cursor control was granted, i.e., the cursor object is left at the last position where the finger had control of the cursor object. The navigation control is disabled until the finger initiates an activation cue within a first boundary region, such as 304. The detector 112 changes the color and/or intensity of the indication element 166 as the finger moves within the sensing space. Notably, the detector 112 can change color pattern having attributes such as blinking rate, contrast, hue, intensity and color as a function of the finger position.

At step 408, a location and a time length can be identified. For example, referring back to FIG. 2, the finger can be positioned within a boundary of the sensing space for a pre-specified period of time. After the detector 112 identifies an activation cue the user can proceed to move the finger to control an object. Notably, the feedback unit 116 provides sensory feedback to the user to inform the user that control of the cursor object has been granted. The sensory feedback can be visual based for the laptop embodiment 150, audio based for the headset 230, and physical, visual, or audio for the mobile device 240. The finger can move around within the sensing space demarcated by a first boundary 304 and a second boundary 314 for controlling a cursor. During movement, the feedback unit 116 receives positional information of the finger within the sensing space. The feedback unit 116 converts positional information to illumination behaviors. For example, referring to FIG. 5, the feedback unit 116 can change the lighting patters when the finger moves between the first boundary 304 and the second boundary 314.

The sensing unit 110 identifies a position of the finger within the sensing space and moves the cursor 124 in accordance with the coordinates calculated by the sensing unit 110. When the finger exceeds a second boundary the handle to the navigation control can be relinquished. Notably, the second boundary movement approximately represents the maximal extent of general finger movement when the hands are stationed in the normal typing position. Notably, the user can change the size of the sensing space to expand or compress the sensing space. For example the user may wish to extend the sensing space beyond a normal hand typing position. The user may want to elevate a hand and control the cursor rather than leaving the hands in a normal default typing position. Accordingly, the detector 112 determines if the user wants to change the sensing space after the activation cue has been detected.

At step 410, a sensitivity of the sensing unit 110 can be adjusted based on the measured time and location. For example, the user can leave the finger within the first boundary region for a time period greater than the time length required in order to satisfy the activation cue for assuming control of the cursor. Notably, the detector 112 begins to expand the region the longer in time the user leaves the finger in the same position when at the location of the activation cue. The detector 112 can be manually configured to not adjust the sensitivity or extent of the boundary regions. The step of adjusting the sensitivity is optional. The detector 112 expands the sensing space by increasing the intensity of the transmitting pulse energy in the sensing unit 110. The higher the pulse energy, the greater the sensing space. Notably, the sensing unit, when activated, produces a transmit pulse with an energy level sufficient to cover the sensing space (i.e. 176 or 300). Accordingly, the sensing unit, when not-activated, reduces the transmit pulse energy such that movement within the sensing space does not produce a reflection of sufficient strength to be detected by the detector 112. In another arrangement, the sensing unit 110 includes a filter which keeps the detector 112 disabled unless an activation cue is received. The filter enables the detector 112 when an activation cue is detected and turns the detector 112 off when the finger leaves the sensing space. The indication element 166 indicates to the user that the sensing space is expanding (e.g. strength of transmitted pulse) either by increasing the blinking rate or changing the blinking style. When the user moves the finger away from the location of the activation cue (e.g. within the first boundary 304) the sensing space no longer changes. Accordingly, the user expands the sensing space by leaving the finger at the activation cue position longer.

For example, a user positions a finger at the center 304 and the detector 112 checks for the location, and the timer 114 checks to ensure a time length is satisfied. During this wait period, the feedback unit 116 can blink the lighting element 166 and increase the rate of the blinking as the time of activation approaches. Upon expiration of the timer, with the finger still at the center 304, the feedback unit 116 changes the blinking pattern to a constant illumination. For example, the light can blink green during authentication of the activation cue and then change to a solid green. The user can identify the change in the visual stimulus as an acknowledgement that control of the cursor has been gained. Similarly, when the user desires to relinquish control of the cursor, the user can move the finger outside a second boundary. The feedback unit 116 can change the illumination, such as the blinking rate, intensity, or color, as the finger approaches the second boundary. Notably, the lighting element 166 changes illumination which provides visual feedback to the user that cursor control will be changed.

At step 412, an activation outside a second boundary can be evaluated. For example, referring to FIG. 2, the user may move the finger 312 outside a second boundary 314. The second boundary can demarcate the maximal range of finger extent when the hand is at a normal typing position. When the finger is within the first boundary 304 and the second boundary 314, movement of the finger results in movement of the cursor 124. The user can move the cursor 124 in accordance with the finger movement when the finger is within the sensing space between the first boundary and second boundary.

For example the feedback unit 116 enables an illumination behavior when a finger is within a first boundary region. The feedback unit 116 adjusting a light pattern of an illumination element as the finger moves within a sensing space. In one aspect, the lighting element 166 can emit a light pattern with sufficient intensity to produce a light pattern on a user's finger. For example, a lighting element positioned downwards on the fingers produces a light pattern on the top side of the finger. In one aspect, the light emitted is not seen until it causes a reflection on the user's fingers or hands. For example, referring to FIG. 2, a lighting element such as a laser pointing down on the keyboard will produce a pattern on the user's fingers. The light pattern provides visual feedback for controlling the cursor object. Notably, a plurality of lighting elements can be positioned circumferential to the sensing space such that trespassing a boundary produces a light pattern on the trespassing object. For example, the light pattern can be generated only when a boundary regions is crossed. Or, the light pattern can change as a boundary is crossed. In one arrangement, the feedback unit 116 disables an illumination behavior when a finger is within a second boundary region. The light pattern provides a visual indication of where the finger can be positioned to control cursory navigation.

At step 414, control can be disabled. Referring back to FIG. 2, when the user moves the finger outside the second boundary 314, cursory navigation control ceases and the cursor remains at the last position when control was enabled. The user can the move the finger back in the sensing space between the first 304 and second boundary 314 without gaining control of the cursor, and hence, without moving the cursor. Understandably, this is beneficial because it allows the user to bring the finger back in the sensing space without moving the cursor from the last position. This action is a hysterics effect. Only when the user brings the finger back to within the first boundary region 304 (or band), does the detector 112 allow the user to regain control of the cursor. Accordingly, the user can resume control of the cursor at the last position thereby providing continuous movement of the cursor 124 around the display 122.

It should be noted that the flowchart 400 for enabling sensory feedback for touchless control is one embodiment of the method. The method of sensory feedback can include identifying a location and movement of a first object and presenting a sensory feedback in accordance with a behavior of the object. For example, the method can include recognizing a movement, such as a finger sign or gesture, and changing a sensory feedback in accordance with the recognized gesture.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A system for touchless feedback control, comprising:
An ultrasonic touchless sensing unit to:
generate a three-dimensional ultrasonic sensory space one inch or more above a device and the ultrasonic sensory space is wider than any size of the device,
generate a plurality of concentric boundary regions within the three-dimensional ultrasonic sensory space that are each associated with a sensory feedback response;
detect and report at least one position of an object in the three-dimensional ultrasonic sensing space from peak-detection of a directed ultrasonic signal with high-resolution positional accuracy; and
an indicator communicatively coupled to the touchless sensing unit, the indicator providing the sensory feedback response associated with the at least one position of the object in the three-dimensional ultrasonic sensory space upon crossing a concentric boundary region,
wherein the sensory feedback response is visual, auditory, or haptic.

2. The system of claim 1, wherein the indicator further comprises:
a timer, wherein the timer identifies a time length the object is moving in the three-dimensional ultrasonic sensory space for resolving the high-resolution positional accuracy; and
a feedback unit cooperatively connected to the timer for changing a behavior of the sensory feedback response in accordance with the time length that the object is moving.

3. The system of claim 2, wherein the touchless sensing unit recognizes a stationarity of the object via position averaging, and the indicator changes the sensory feedback response based on the stationarity that is recognized in a respective concentric boundary region.

4. The system of claim 1, wherein the sensing unit generates a the ultrasonic sensing space to include the plurality of concentric boundary regions in the ultrasonic sensory space each associated with at least one color, wherein the indicator changes to a color representative of the position of the object when the object is within a respective concentric boundary region corresponding to the color.

5. The system of claim 4, wherein the indicator projects a light pattern on the object, and the light pattern that changes behavior in accordance with the location of the object.

6. The system of claim 1, wherein the touchless sensing unit comprises
an array of ultrasonic sensors integrated on an embedded device; and
a processor communicatively coupled to said array of ultrasonic sensors for communicating a coordinate of said object within said three-dimensional space by
emitting an ultrasonic pulse from a first ultrasonic transducer configured to transmit the ultrasonic pulse to produce a directed ultrasonic signal;
estimate a time of flight between when said ultrasonic pulse was transmitted and when the reflected ultrasonic signal was received for a plurality of ultrasonic transducers by wave-front peak detection;
calculate a differential receive time by peak differencing between the directed ultrasonic signal and a previously received directed ultrasonic signal for the plurality of ultrasonic transducers; and
determine the position and relative displacement of said object from said time of flight measurements and said differential receive time measurements for the plurality of ultrasonic transducers from repeated operation.

7. The method of claim 6, further comprising adjusting the sensory feedback in accordance with an ultrasonic transmit strength of the three-dimensional ultrasonic sensory space.

8. The method of claim 7, wherein providing sensory feedback further comprises:
adjusting a sensory feedback to signify gaining control of the object; and
adjusting the sensory feedback to signify relinquishing control of the object.

9. The system of claim 1, wherein the indicator is at least one of a light emitting diode, a monitor, a light contrast display (LCD), an array of illuminating elements, a laser, a color strip, a sound speaker, or a vibration element.

10. The system of claim 1, wherein the indicator is an illumination element behind a keypad that emanates visible light through the keys.

11. A method for touchless feedback control the steps of:
generating a three-dimensional ultrasonic sensory space one inch or more above a device that is wider than any size of the device,
generating a plurality of concentric boundary regions within the three-dimensional ultrasonic sensory space that are each associated with a sensory feedback response;
monitoring a movement of an object the three-dimensional ultrasonic sensing space from peak-detection of a directed ultrasonic signal with high-resolution positional accuracy;
reporting the position of the object in the three-dimensional ultrasonic sensing space with high-resolution positional accuracy; and
providing the position of the object with the sensory feedback in accordance with the movement,
wherein the sensory feedback is visual, auditory, or haptic.

12. The method of claim 11, further comprising:
identifying a location of the object when it is stationary in a concentric boundary region of the three-dimensional ultrasonic sensory space; and
adjusting an intensity of the sensory feedback based on the location.

13. The method of claim 11, further comprising
determining a length of time the object is at a location; and
adjusting a behavior of the sensory feedback based on the length of time.

14. The method of claim 11, further comprising:
tracking a finger in a touchless ultrasonic sensing space; and
adjusting an illumination in accordance with a location of the finger in the touchless ultrasonic sensing space,
wherein the ultrasonic sensing space is between 1 cm and 10 cm above the touchless sensing unit.

15. The method of claim 11, further comprising:
determining if a location of the object is within a boundary region of a touchless sensing space; and
changing to an illumination that corresponds to the boundary region.

16. The method of claim 11, wherein the step of providing sensory feedback changes a lighting pattern, a blinking rate, an intensity, or a color.

17. A method for providing sensory feedback during touchless object control, comprising:
generating a three-dimensional ultrasonic sensory space one inch or more above a device that is wider than any size of the device,
generating a plurality of concentric boundary regions within the three-dimensional ultrasonic sensory space that are each associated with a sensory feedback response
detecting a movement of a finger within the three-dimensional ultrasonic sensory space ;
reporting a precise position of the finger in the three-dimensional ultrasonic sensing space from peak-detection of a directed ultrasonic signal with high-resolution positional accuracy;
controlling an object in accordance with the movement; and
providing sensory feedback in accordance with the controlling, wherein the sensory feedback is visual, auditory, or haptic.

18. The method of claim 17, further comprising:
determining if the finger is within a concentric boundary region; and
changing to an illumination that corresponds to the concentric boundary region.

19. The method of claim 18, wherein the providing sensory feedback further comprises changing an intensity of the illumination based on an ultrasonic transmit of the three-dimensional ultrasonic sensory space at the location of the finger.

20. The method of claim 18, further comprising
recognizing a movement of the object, and changing the sensory feedback to identify the movement that is recognized.

* * * * *